(12) United States Patent
Anderson

(10) Patent No.: US 9,986,698 B2
(45) Date of Patent: Jun. 5, 2018

(54) PROCESS AND APPARATUS FOR THE RESTORATION OF SEAGRASS

(71) Applicant: James Anderson, Ruskin, FL (US)

(72) Inventor: James Anderson, Ruskin, FL (US)

( * ) Notice: Subject to any disclaimer, the term of this patent is extended or adjusted under 35 U.S.C. 154(b) by 58 days.

(21) Appl. No.: 15/196,423

(22) Filed: Jun. 29, 2016

(65) Prior Publication Data

US 2018/0000030 A1    Jan. 4, 2018

(51) Int. Cl.
*A01G 33/00* (2006.01)
*A01C 11/00* (2006.01)
*A01C 21/00* (2006.01)
*E02B 3/04* (2006.01)

(52) U.S. Cl.
CPC .......... *A01G 33/00* (2013.01); *A01C 11/003* (2013.01); *A01C 21/00* (2013.01); *E02B 3/04* (2013.01)

(58) Field of Classification Search
CPC ....... A01G 33/00; A01C 11/003; A01C 11/00; A01C 21/00; E02B 3/04; E02B 3/00
USPC ........... 47/59, 33, 63, 64, 73, 65.8, 65.7, 74, 47/58.1, 111, 100; 504/150; 405/19, 24; 111/100
See application file for complete search history.

(56) References Cited

U.S. PATENT DOCUMENTS

| | | | | |
|---|---|---|---|---|
| 2,698,167 A * | 12/1954 | Baumgardner | ..... | E01C 19/1045 126/343.5 A |
| 3,608,238 A | 9/1971 | Reuter | | |
| 3,613,309 A | 10/1971 | Coburn | | |
| 5,193,306 A | 5/1993 | Whisenant | | |
| 5,241,783 A | 9/1993 | Krueger | | |
| 5,309,673 A | 5/1994 | Stover | | |
| 6,415,548 B1 | 7/2002 | Mumme | | |
| 6,493,990 B1 * | 12/2002 | Anderson | ............ | A01C 11/003 47/65.7 |
| 2003/0150160 A1 * | 8/2003 | Anderson | ............ | A01C 11/003 47/73 |
| 2004/0033248 A1 * | 2/2004 | Pursell | ................... | A01N 25/08 424/411 |
| 2014/0260465 A1 * | 9/2014 | Lory | ....................... | C05B 17/00 71/17 |

OTHER PUBLICATIONS

Margaret O. Hall, Developing Technologies to Enhance the Recovery Rates of Propeller Scars in Turtlegrass (*Thallassia testudinum*) Meadows, Final Report to USFWS, Mar. 2006.
Margaret O. Hall, Experimental Evaluation of Techniques to Restore Severe Boat Damage in South Florida Seagrass Habitats, Final Report to Florida's State Wildlife Grant Program, Jun. 2012.

* cited by examiner

*Primary Examiner* — Christopher J. Novosad
(74) *Attorney, Agent, or Firm* — Larson & Larson, P.A.; Justin P. Miller; Patrick A. Reid

(57) ABSTRACT

The improved process and apparatus for the restoration of seagrass includes a biodegradable bag or sack, referred to as a sediment tube, that is filled with sand and placed in a prop scar or blow hole. The sediment tube corrects many issues created a prop scar or blowhole: (1) the trench or hole is filled, restoring the elevation of the scar to the surround grade of the seagrass; (2) the sediment tubes stabilize the scar, preventing further erosion of the sand by the flow of water; (3) the sediment tube optionally includes fine-grained sediments that promote seagrass growth and recovery; and (4) the sediment tube includes fertilizer and/or other chemical or minerals that encourage growth.

15 Claims, 3 Drawing Sheets

PROCESS AND APPARATUS FOR THE RESTORATION OF SEAGRASS

FIELD

This invention relates to the field of aquatic plant restoration and more particularly to a process and apparatus to restore seagrass in areas damaged by boating.

BACKGROUND

Seagrass is the common term for a broad class of underwater plants that grow in coastal zones. Seagrasses are generally tall and green, and grow across large underwater areas. These underwater areas resemble meadows—thus the term seagrass.

Seagrasses create energy using photosynthesis, and thus need sun. As a result seagrass does best in shallow water.

The importance of seagrass to the aquatic ecosystem is difficult to overstate. Seagrass provides food for marine life, a nursery for both adult and juvenile invertebrates and vertebrates, a natural wavebreak by absorbing the energy of incoming water, a stabilizing layer for the sand and soil, and after death the decomposition supports yet more forms of aquatic life. Seagrass also sequesters carbon and captures nutrients from the surrounding aquatic environment.

Seagrass is sometimes likened to the aquatic equivalent of the terrestrial rainforests. As with rainforests, preservation is critical.

In the U.S., seagrass is concentrated in the Gulf of Mexico, coasts of Florida, and south along Central America to Columbia and Venezuela in South America.

Restoration work in the U.S. is concentrated around Florida because of Florida's large number of boaters, and the damage that results from negligent boating.

Florida species of seagrass include:

| Scientific name | Common name |
| --- | --- |
| Thalassia testudinum | Turtle grass |
| Halophila engelmannii | Star grass |
| Halophila decipiens | Paddle grass |
| Halodule beaudettei | Shoal grass |
| Halophila johnsonii | Johnson's seagrass |
| Syringodium filiforme | Manatee grass |
| Ruppia maritima | Widgeon grass |

Different species of seagrass are native to different areas of the world.

The survival of seagrass is under constant threat. Harm to seagrass comes in the form of environmental damage as a result of overdevelopment, and physical damages from boaters.

Boaters are a great hazard to seagrass due to its preference for shallow water. Additionally, boaters often have trouble determining whether a given stretch of water is deep enough because depth varies due to tide and currents. Damage to seagrass by boating results in prop scars and blowholes.

Prop scars are caused by contact between the propeller/rudder/outdrive of a boat and the seagrass/sand. When viewed from overhead, prop scarring appears as long lines of sand amidst areas of green seagrass, drawing the analogy to a scar.

The result of the damage is a depression in the sand that creates a trench, destroys the seagrass, and displaces the sand.

Boat damage may also create blow holes. A blow hole is caused when a boat has become stuck and the operator attempts to free the boat by running the boat at high throttle. The resulting prop wash from the propeller pushes the sand away from the area behind the propeller, creating a hole.

As compared to prop scars, blow holes are round and deep, rather than long and shallow.

For both prop scars and blowholes the sand and vegetation displaced during formation may create a berm, or elevated perimeter, around the damage. This displaced sand may bury nearby seagrass, causing further damage.

When viewed from above the damage caused by a prop scar or blowhole can be seen as current carries away the now-exposed sand. The loose sand blows across the field of seagrass, much like smoke from a fireline.

Any damage to seagrass reduces its ability to sustain its local environment, depressing fish stocks and stressing the ecosystem. Thus, recovery as quickly as possible is key to limiting damage.

Without intervention, prop scars recover in one year, if minor, or as long as sixty years for severely damaged areas. Deep scars require particularly long periods of time for recovery because the newly-exposed sediment does not readily support the growth of seagrass, and without seagrass roots to stabilize the soil it is prone to washing away.

Given this difficult environment, what is needed is a process and apparatus for the restoration of damaged seagrass.

SUMMARY

The disclosed device and process includes a biodegradable bag or sack, referred to as a sediment tube, that is filled with sand and placed in a prop scar or blow hole. The sediment tube corrects many issues created by a prop scar or blowhole: (1) the trench or hole is filled, restoring the elevation of the scar to the surround grade of the seagrass; (2) the sediment tubes stabilize the scar, preventing further erosion of the sand by the flow of water; (3) the sediment tube optionally includes fine-grained sediments that promote seagrass growth and recovery; and (4) the sediment tube includes fertilizer and/or other chemicals, nutrients or minerals that encourage growth.

In its preferred embodiment, the sediment tube is between 32" and 48" long, with a diameter of between 14" and 25". It is anticipated that other dimensions are also acceptable, depending on varying local conditions.

The sediment tube is comprised of a number of elements. The outer layer is a biodegradable container or bag. The bag is constructed of natural or synthetic textiles. Natural textiles include coconut fibers, hemp, cotton, and burlap. Synthetic textiles include degradable polymers, biodegradable polymers, and agro-polymers.

Also anticipated are polymeric films that are produced without, or with a limited amount of, ultraviolet inhibitors. In the absence of ultraviolet inhibitors the films readily degrade as a result of exposure to sunlight.

The preferred embodiment includes a bag made of either cotton or burlap because cotton and burlap are easy to work with, readily available, and as natural materials are environmentally safe.

The use of a natural or biodegradable materials is important because the sediment tube is intended to be a temporary structure that will biodegrade and return to the environment. The structure of the tube holds the sand only until the seagrass roots re-stabilize the surrounding sand.

Different conditions may require the use of different materials in order to select a material that biodegrades at the required rate. For example, cotton sediment tubes degrade in four to six months under most conditions. Generally, four to six months is sufficient to allow the seagrass to take root and penetrate the top, bottom, and sides of the sediment tube.

Initially, the biodegradable bag is sealed at one end, and open at the other. This allows it to be filled with the growing medium, which is primarily sand.

The type of sand chosen to fill the biodegradable bag depends upon the location. Before discussing types of sand, it is helpful to define the term "sand." Sand is generally defined as the granular material one finds on a beach. More specifically, sand is a sedimentary mineral material with a particle size between 0.00625 mm and 2 mm. If the material has a smaller size, it is classified as silt or clay. If the material has a larger size, it is classified as pebbles and boulders.

Returning to types of sand, sand that is found on beaches can be divided into two groups. One is carbonate sands, or sands made of particles of $CaCO_3$, or calcium carbonate. The other is siliciclastic sands, where "silici-" refers to a composition containing silicate material and "-clastic" refers to the origin of the grains of sand as pieces of silicate rocks.

The appropriate choice for use within the sediment tube depends upon the location the sediment tube will be placed. For the coasts south of Miami, continuing down to Key West, calcium carbonate is the preferred choice.

Along the west and east coasts of Florida, as well as the Florida Panhandle region, silica sand or local sand is the preferred choice.

The appropriate choices of sand will vary for other areas of the world.

Regardless of the source of the sand, screening or sifting is sometimes required to remove contaminants.

As discussed above, the goal of the sediment tube is to rapidly reintroduce seagrass to an area where it has been forcibly removed by boats or other damaging outside influence. The longer the seagrass is missing, the more damage is done to the environment through a reduction in the fish population, shelter for aquatic animals, and so forth. Thus, the faster the seagrass can grow the greater the benefit of the sediment tube. The disclosed sediment tube increases the growth rate of the seagrass through the use of fertilizers, minerals, and/or organic growing medium.

The fertilizer is mixed with the sand prior to filling the bag, allowing for even distribution of the fertilizer through the sand.

The preferred fertilizer is pelletized Peruvian seabird guano, which is a solidified excrement of a certain type of seabird. The preferred fertilizer has an N—P—K (nitrogen (N), phosphorus (P), and potassium (K)) rating of 12-12-2.5, and is listed with the Organic Materials Review Institute (OMRI). The preferred fertilizer includes 2% water soluble nitrogen and 8% water insoluble nitrogen. When introduced to water, the pelletized Peruvian seabird guano breaks down, making its nutrients available to the seagrass.

The ratio of fertilizer to sand is important to provide a sufficient amount to increase seagrass growth, but without being wasteful, or causing harm to the seagrass.

A range of 1 to 5 tablespoons of seabird guano per 60 pounds of sand is effective at increasing the seagrass growth rate. The result is reduced time that seagrass is missing, and therefore a faster return to a healthy environment.

As an alternative to volumetric measuring, different quantities of fertilizer may be chosen based upon the concentration of the fertilizer. For example, fertilizers with a 12% nitrogen concentration are preferably added at 4 pounds of fertilizer per cubic yard of sand. The ratio remains consistent, thus for fertilizer of a 4% nitrogen concentration, 12 pounds of fertilizer is required per cubic yard of sand.

Additional acceptable ranges for the added fertilizer include 0 to 15% nitrogen, added at a rate of one pound of fertilizer per cubic yard of sand. Alternative types of fertilizer include chicken manure/guano, which in a preferred embodiment has an N—P—K rating of 4-3-4.

In addition to the nitrogen/phosphorus/potassium of a fertilizer, the addition of other elements is sometimes required to support the growth of healthy seagrass. For example, sediment tubes planted in Florida Bay, located between the southern end of the Florida mainland and the Florida Keys, require the addition of iron.

In order to determine whether such additional minerals are needed, one may perform a soil test prior to planting. Such a test of the soil or sand allows one to determine its composition prior to planting. Thus the required components, whether fertilizer, mineral, or similar, may be determined, and added to the sediment tubes during filling.

After the bag is filled and sealed, it is ready for placement in the prop scar or blowhole.

Following placement, the sediment tubes are allowed to "season" for three months before planting the seagrass. Seasoning allows local organisms, such as bacteria and algae, to propagate inside the bag. The result is what is known informally as "live sand." Planting seagrass without waiting for the sediment tubes to season reduces the chances of the seagrass successfully propagating within the sediment tubes.

In addition to the bacteria and algae that are introduced to the sediment tubes during the seasoning process, this time also allows the sediment tubes to begin to decompose. Planting seagrass into non-decomposed sediments tubes is risky for the plants, which may be unable to seat themselves and will break off in high wave conditions.

When the sediments tubes have seasoned it is time to plant. There are multiple ways one may plant seagrass within a sediment tube. One may use seeds, bare roots, or sprigs into the sediment tube. Bare roots are harvested from other healthy seagrass beds, and sprigs are immature seagrass plants. Sprigs may be used to create pre-rooted plugs, which are formed from harvested seagrass that is formed into plugs, then allowed to grow for a period of time, allowing roots to develop in a controlled environment. Pre-rooted plugs are more robust, and thus more likely to survive and flourish.

To make an opening in the sediment tube, a cut or score is made in the fabric. The seed, bare root planting unit, or sprig is inserted into this opening.

The quantity of seeds, bare roots, or sprigs planted into a given sediment tube varies depending upon the area and the desired density.

Following the planting, little additional work is required. Protecting the area against additional damage by boaters is recommended. But no additional intervention is required. The bags will continue to biodegrade until the material is part of the environment. The seagrass will send out runners, tying the sand of the sediment tube to that of the surrounding area, and vice versa. The seagrass will continue to grow, and eventually the scar will disappear into the surrounding seagrass.

In addition to prop scars, the above method may be used to treat blowholes. Given the greater size of a blowhole, it is preferable to fill it with limestone pea rock or clean sand prior to the addition of sediment tubes. Rock is the preferred fill because rock is too large to mix with the water to create turbid water and rock more readily stays in its placed location. If sand is used, a turbidity barrier may be used around the repaired location to keep the turbid water contained.

Planting seagrass within the placed sediment tubes is not always required. Instead, in some embodiments, the sediment tubes are used to bring the surrounding sand to grade. This creates a healthy seafloor, and natural plants and animals may utilize the sediment tubes as needed.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
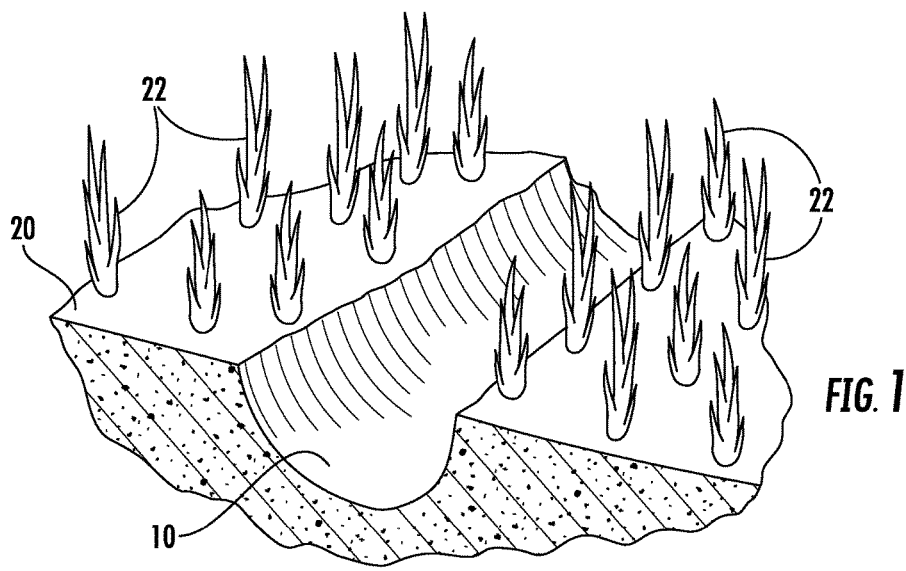
FIG. 1 illustrates a prop scar prior to the introduction of the sediment tube.

Reference will now be made in detail to the presently preferred embodiments of the invention, examples of which are illustrated in the accompanying drawings. Throughout the following detailed description, the same reference numerals refer to the same elements in all figures.

Referring to FIG. 1, a prop scar prior to the introduction of the sediment tube is shown. The propeller scar 10 is shown cutting through the estuary bottom 20. Along the estuary bottom 20 is existing seagrass 22.

Figure 2:
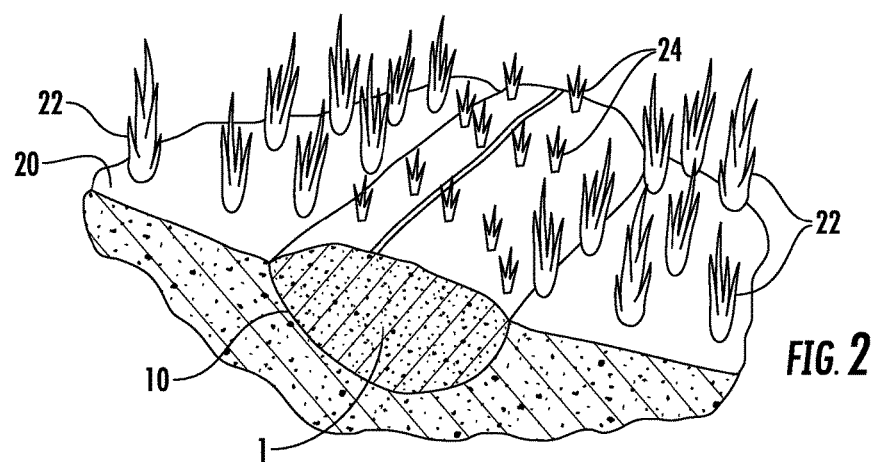
FIG. 2 illustrates a prop scar with a sediment tube.

Referring to FIG. 2, a prop scar with a sediment tube is shown. The propeller scar 10 is now shown filled with the sediment tube with internal fertilizer 1, filling the depression along the estuary bottom 20. Along the estuary bottom 20 is existing seagrass 22, with transplanted seagrass 24 shown planted in the sediment tube with internal fertilizer 1.

Figure 3:
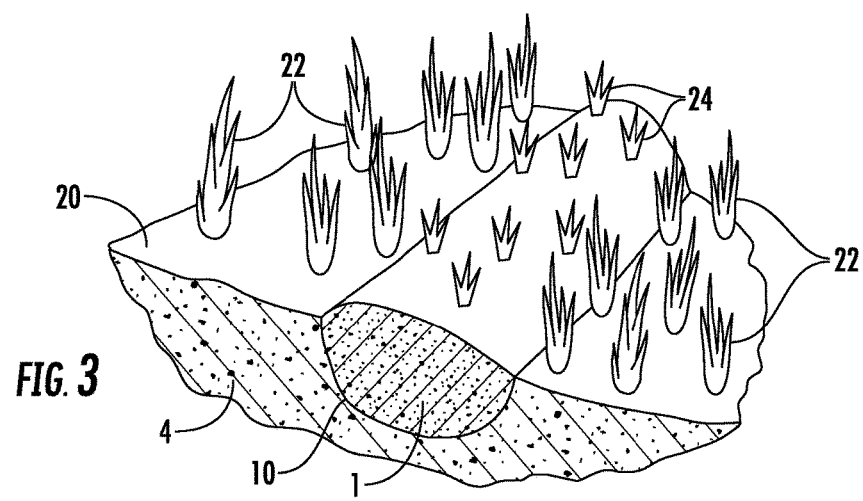
FIG. 3 illustrates a prop scar with a sediment tube showing more mature seagrass.

Referring to FIG. 3, a prop scar with a sediment tube showing more mature seagrass is shown. The transplanted seagrass 24 shown is more mature, and the sediment tube with internal fertilizer 1 has started to blend into the estuary bottom 20. Runners 26 (not shown) are starting to tie the transplanted seagrass 24 to the estuary bottom 20.

Figure 4:
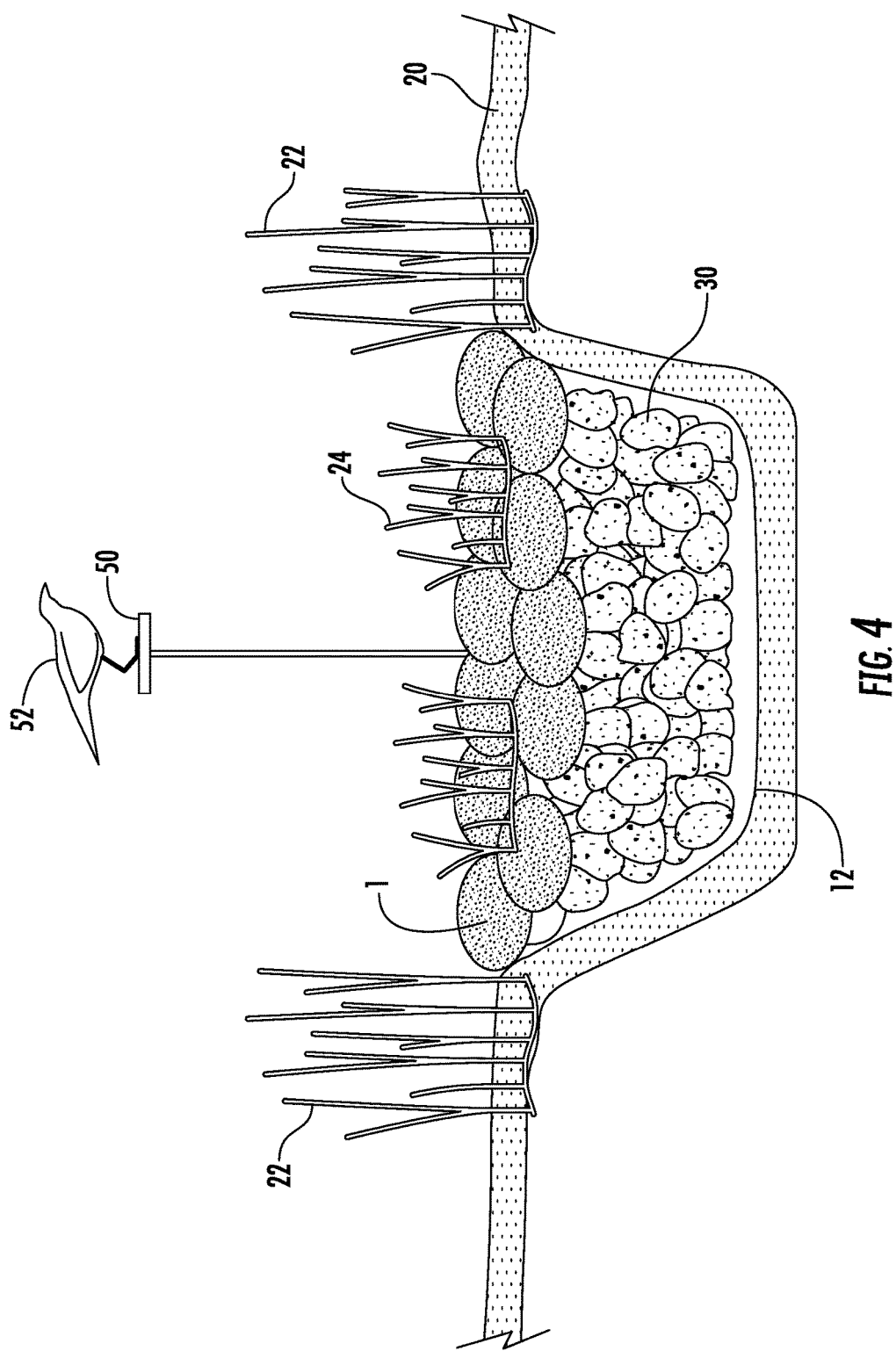
FIG. 4 illustrates a blowhole filled using rock and sediment tubes.

Referring to FIG. 4, a blowhole filled using rock and sediment tubes is shown. Aggregate 30, such as lime rocks, pea gravel, or other small stones, is used to fill the bulk of the blowhole 12, then topped with sediment tubes with internal fertilizer 1. The existing seagrass 22 and transplanted seagrass 24 cover the bottom, connecting the estuary bottom 20 to the sediment tubes with internal fertilizer 1.

Also shown is the optional bird perch 50 that acts to encourage birds 52 to roost over the damaged area, ideally resulting in additional guano.

Figure 5:
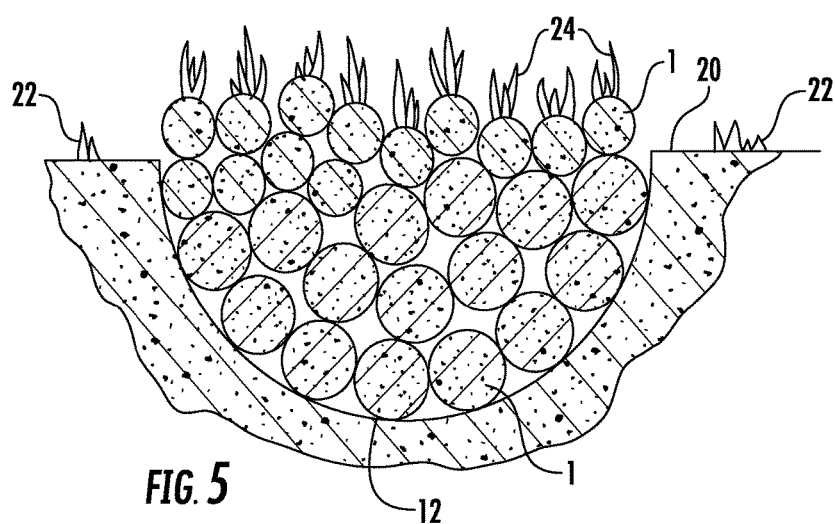
FIG. 5 illustrates a blowhole, or deep prop scar, filled using only sediment tubes.

Referring to FIG. 5, a blowhole, or deep prop scar, filled using only sediment tubes is shown. Here sediment tubes with internal fertilizer 1 are used without any aggregate. This may be useful when aggregate is difficult to obtain, but sand is readily available.

Figure 6:
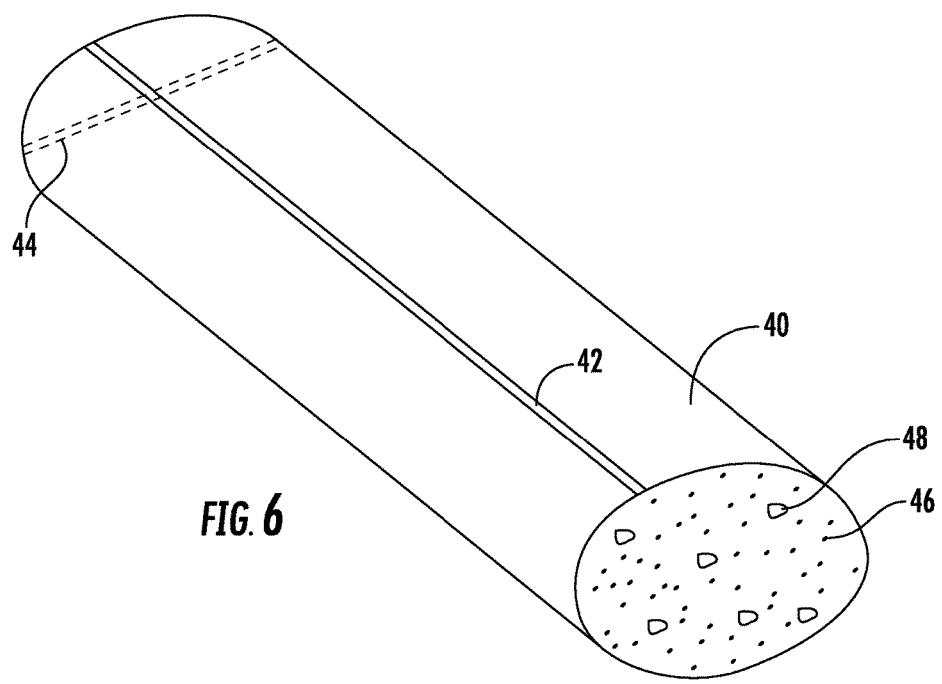
FIG. 6 illustrates a sediment tube prior to placement.

Referring to FIG. 6, a sediment tube prior to placement is shown. The flexible shell or bag 40 is shown, sewn along a longitudinal seam 42. The terminal seam 44 closes one end. Within the flexible shell 40 is the growing medium 46, likely sand, with the addition of fertilizer 48.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A process for restoring underwater aquatic plants to a damaged location within an estuary, the process comprising:
   a. filling a sediment tube, the sediment tube including:
      i. a biodegradable outer layer;
      ii. a growing medium within the biodegradable outer layer, the growing medium including sand and one or more fertilizers;
   b. sealing the sediment tube to prevent leakage of the growing medium;
   c. placing the sediment tube within the damaged location;
   d. allowing the sediment tube to season, whereby local organisms introduce themselves to the growing medium; and
   e. cutting an opening within the biodegradable outer layer of the sediment tube.

2. The process of claim 1, further comprising, after step e, the step of:
   a. planting one or more seagrasses in the growing medium.

3. The process of claim 1, wherein the one or more fertilizers is Peruvian seabird guano.

4. The process of claim 1, comprising an additional step, prior to step a, of selecting a type of sand based upon the sand present in the damaged location, the selected type of sand used within the growing medium.

5. The process of claim 1, comprising an additional step, prior to step a, of partially filling the damaged location with an aggregate.

6. The process of claim 1, comprising the following additional steps prior to step a:
   a. obtaining a soil sample from the damaged area;
   b. testing the soil sample for nutrient content;
   c. selecting one or more seagrass species to plant in the damaged area;
   d. selecting the one or more fertilizers based upon the results of the soil sample, and the needs of the one or more seagrass species.

7. The process of claim 1, wherein the biodegradable outer layer is a polymeric film produced without ultraviolet inhibitors, whereby sunlight breaks down the polymeric film over time.

8. The process of claim 1, wherein the one or more appropriate fertilizers is a fertilizer with a nitrogen concentration between 0% and 15% is added to the sand in a ratio of one pound per cubic yard.

9. A process for restoring underwater aquatic plants to a damaged location within an estuary, the process comprising:
   a. performing a composition test of the damaged location;

b. determining what additional components are required for seagrass growth, such additional components are fertilizers, chemicals, or minerals that aid in plant growth;

c. filling a sediment tube, the sediment tube including:
 i. a biodegradable outer layer;
 ii. sand; and
 iii. the additional components chosen in the previous step;

d. sealing the sediment tube to prevent leakage of the sand;

e. placing the sediment tube within the damaged location;

f. cutting an opening within the biodegradable outer layer of the sediment tube; and g. inserting one or more seagrass plants.

10. The process of claim 9, further comprising the following additional step after step e:

a. waiting to allow the sediment tube to season, whereby the sand of the sediment tube accumulates organisms to create live sand.

11. The process of claim 10, wherein the period of time is more than one week but less than six months.

12. The process of claim 9, wherein the one or more fertilizers is Peruvian seabird guano.

13. The process of claim 9, comprising an additional step, prior to step a, of selecting a type of sand based upon the sand present in the damaged location.

14. The process of claim 9, comprising an additional step, prior to step a, of partially filling the damaged location with an aggregate.

15. The process of claim 9, wherein a fertilizer with a nitrogen concentration between 0% and 15% is added to the sand in a ratio of one pound per cubic yard.

* * * * *